United States Patent
Nakamura

(10) Patent No.: US 9,886,643 B2
(45) Date of Patent: Feb. 6, 2018

(54) CHARACTER SEGMENTATION DEVICE, CHARACTER RECOGNITION DEVICE AND CHARACTER SEGMENTATION METHOD

(71) Applicant: NIDEC SANKYO CORPORATION, Suwa-gun, Nagano (JP)

(72) Inventor: Hiroshi Nakamura, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 3 days.

(21) Appl. No.: 15/084,717

(22) Filed: Mar. 30, 2016

(65) Prior Publication Data

US 2016/0292528 A1    Oct. 6, 2016

(30) Foreign Application Priority Data

Mar. 31, 2015 (JP) ................... 2015-074178

(51) Int. Cl.
    *G06K 9/34* (2006.01)
    *G06K 9/66* (2006.01)
    *G06K 9/38* (2006.01)

(52) U.S. Cl.
    CPC ............... *G06K 9/344* (2013.01); *G06K 9/38* (2013.01); *G06K 2209/01* (2013.01)

(58) Field of Classification Search
    CPC ............................. G06K 9/344; G06K 9/4609
    USPC ........ 382/172, 173, 174, 177, 181, 190, 276
    See application file for complete search history.

(56) References Cited

U.S. PATENT DOCUMENTS

| | | | | |
|---|---|---|---|---|
| 6,473,517 B1* | 10/2002 | Tyan | ...................... | G06K 9/344 382/105 |
| 6,853,751 B1* | 2/2005 | Milligan, Jr. | ......... | G06K 9/4609 382/199 |
| 8,401,299 B2* | 3/2013 | Nakamura | ............... | G06K 9/38 382/190 |
| 9,607,237 B2* | 3/2017 | Wada | ..................... | G06K 9/344 |

FOREIGN PATENT DOCUMENTS

JP       2014130415 A       7/2014

* cited by examiner

*Primary Examiner* — Sheela C Chawan
(74) *Attorney, Agent, or Firm* — Cantor Colburn LLP

(57) ABSTRACT

A character recognition device may include an image sensor to acquire image and a data processor configured to segment a character string from the image data. The data processor may be configured to detect positions to segment the characters; set an area to detect a position for segmenting characters; create a first projection of pixel values arranged in the character arrangement direction along which characters are arranged and a second projection of pixel values arranged in an orthogonal to said character arrangement direction; calculate a synthetic threshold value of a first threshold, acquired by applying a discriminant analysis method on said first, X-axis projection, and a second threshold, acquired by applying said discriminant analysis method on said second, Y-axis projection, and take it as a binary threshold for said setting area; and acquire character segmenting positions based on said binary threshold.

3 Claims, 10 Drawing Sheets

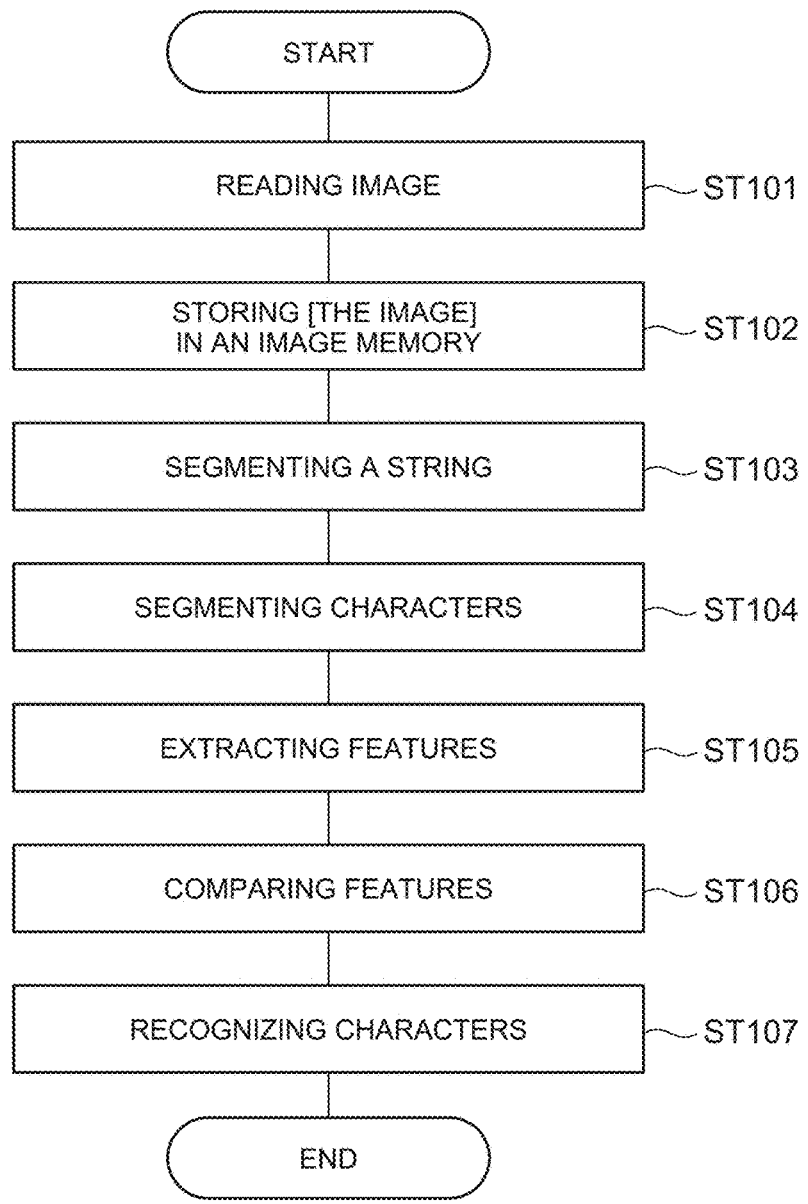

CHARACTER SEGMENTATION DEVICE, CHARACTER RECOGNITION DEVICE AND CHARACTER SEGMENTATION METHOD

CROSS REFERENCE TO RELATED APPLICATION

The present application claims priority under 35 U.S.C. §119 to Japanese Application No. 2015-074178 filed Mar. 31, 2015, the entire content of which is incorporated herein by reference.

FIELD OF INVENTION

At least an embodiment of the present invention relates to a character recognition technology which processes multi-valued digital image data obtained by capturing a character string on a medium such as a piece of paper, plastic, etc. to segment every character from the character string, and particularly relates to a character segmentation device, a character recognition device and a character segmentation method which recognizes characters by searching segmenting positions between characters in a character string in the captured image.

BACKGROUND

Various methods and devices are proposed to implement character recognition using a multi-valued digital image; in general, a binary image is a recognition object in character recognition device; a multi-valued image needs to be binarized for input. A recognition performance of the character recognition device is determined by how precisely characters, which are recognition objects, are separated from a background which is a non-recognition-object. Therefore, as a method for determining a binary threshold to binarize a multi-valued image, a character recognition device using a discriminant analysis method has been proposed/presented, for example (Patent reference 1, for example).

PRIOR ART

Patent Reference

[Patent Reference 1] Unexamined Japanese Patent Application Publication 2014-130415

However, the discriminant analysis method is a method to binarize an image by taking a threshold from the pixel value having the highest separation level in the histogram which presents the distribution of the data of the pixel values of the entire image. Therefore, when the number of pixels in the background is overwhelmingly larger than the number of pixels of the line image such as a character which is a recognition object, a character segmentation binary threshold, which is used for segmenting characters, is biased to the background side; consequently, the binary threshold won't be accurately determined, and therefore, only a low quality binary image can be obtained depending on the multi-valued digital image.

SUMMARY

Therefore, at least an embodiment of the present invention provides a character segmentation device, a character recognition device and a character segmentation method capable of preventing a binary threshold from becoming biased to the background side and improving the character recognition performance.

A character segmentation device of at least an embodiment of the present invention processes image data obtained by capturing a character string on a medium to segment every character from the character string, and has a character segmenting position-detecting unit for detecting positions to segment characters composing the character string; wherein the character segmenting position-detecting unit includes an area-setting section which sets an area in which the character segmenting positions are to be detected; a projection-creating section which creates a first projection of the pixel values of the pixels arranged in the character arrangement direction along which the characters are arranged, and a second projection of the pixel values of the pixels arranged in the direction orthogonal to the character arrangement direction, within the area which is set by the area-setting section; a binary threshold-acquiring section which acquires a first threshold by implementing a discriminant analysis method on the first projection in the character arrangement direction and a second threshold by implementing the discriminant analysis method on the second projection in the direction orthogonal to the character arrangement direction, and creates a synthetic threshold of the first and second threshold values and sets it as a binary threshold for the setting area; and a position-detecting section which calculates character-segmenting positions based on the binary threshold acquired by the binary threshold-acquiring section.

In at least an embodiment of the present invention, in the image binarization process, the first projection of the pixel values of the pixels arranged in the character arrangement direction and the second projection of the pixel values of the pixels arranged in the direction orthogonal to the character arrangement direction are acquired within the setting area containing the character string which is an object to character recognition, and then both of the binary thresholds acquired by implementing the discriminant analysis process on the projections are used to calculate a binary threshold for the entire setting area; therefore, the binary threshold is prevented from becoming biased to the background side. As a result, the character line drawing in the binary image can be prevented from becoming thicker than necessary.

The character recognition device of at least an embodiment of the present invention is a character recognition device for segmenting every character from a character string segmented from image data and recognizing the characters, comprising an image reading section for capturing a character string on a medium and reading it as image data, an image memory for the storing the image captured by the image reading section, and a data processing section for segmenting a character string from the image data stored in the image memory and then segmenting characters from the character string to recognize the characters; wherein the data processing section includes a character segmentation unit provided with a character segmenting position-detecting unit to detect the segmenting positions for the characters which compose the segmented character string; the character segmenting position-detecting unit includes an area-setting section for setting an area in which the positions to segment the characters are detected, a projection-creating section which creates a first projection of the pixel values of the pixels arranged in the character arrangement direction along which the characters are arranged and a second projection of the pixel values of the pixels arranged in the direction orthogonal to the character arrangement direction, within the area set by the area-setting section, a binary threshold-acquiring section which calculates a first threshold value by implementing a discriminant analysis method on the first projection in the character arrangement direction and a second threshold value by implementing the discriminant analysis method on the second projection in the direction orthogonal to the character arrangement direction, creates a synthetic threshold of the first and second threshold values and sets the synthetic threshold value as a binary threshold for the setting area, and a position-detecting section which acquires the character-segmenting positions based on the binary threshold acquired by the binary threshold-acquiring section.

In at least an embodiment of the present invention, the [final] binary threshold can be prevented from becoming biased to the background side. As a result, the character recognition performance can be improved.

Also, a character segmentation method of at least an embodiment of the present invention, which processes image data obtained by capturing a character string on a medium to segment every character from the character string, has a character segmenting position-detecting step; wherein the character segmenting position-detecting step includes an area-setting step for setting an area in which the character segmentation positons are to be detected, a projection-creating step for creating a first projection of the pixel values of the pixels arranged in the character arrangement direction and a second projection of the pixel values of the pixels arranged in the direction orthogonal to the character arrangement direction, a binary threshold-acquiring step for calculating a first threshold value by implementing a discriminant analysis method on the first projection in the character arrangement direction and a second threshold value by implementing the discriminant analysis method on the second projection in the direction orthogonal to the character arrangement direction, and calculating a synthetic threshold value of the first and second threshold values and setting it as a binary threshold for the afore-mentioned setting area, and a position-detecting step for acquiring character segmenting positions based on the binary threshold acquired in the binary threshold-acquiring step.

In at least an embodiment of the present invention, in the image binarization process, the first projection of the pixel values of the pixels arranged in the character arrangement direction and the second projection of the pixel values of the pixels arranged in the direction orthogonal to the character arrangement direction are acquired, and a binary threshold for the entire setting area is acquired by using a binary threshold value obtained by implementing the discriminant analysis processing on each of the projection; therefore, the binary threshold value can be prevented from becoming biased to the background side. Consequently, the character line drawing in the binary image can be prevented from becoming thicker than necessary.

According to at least an embodiment of the present invention, a binary threshold is prevented from becoming biased to the background side. Consequently, the character line drawing in the binary image can be prevented from becoming thicker than necessary, and accordingly, the character recognition performance can be improved.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which:

FIG. 9 is a flowchart to explain the operation of the character recognition device of this embodiment.

DETAILED DESCRIPTION

An embodiment of the present invention is described hereinafter associated with the drawings.

Figure 1:
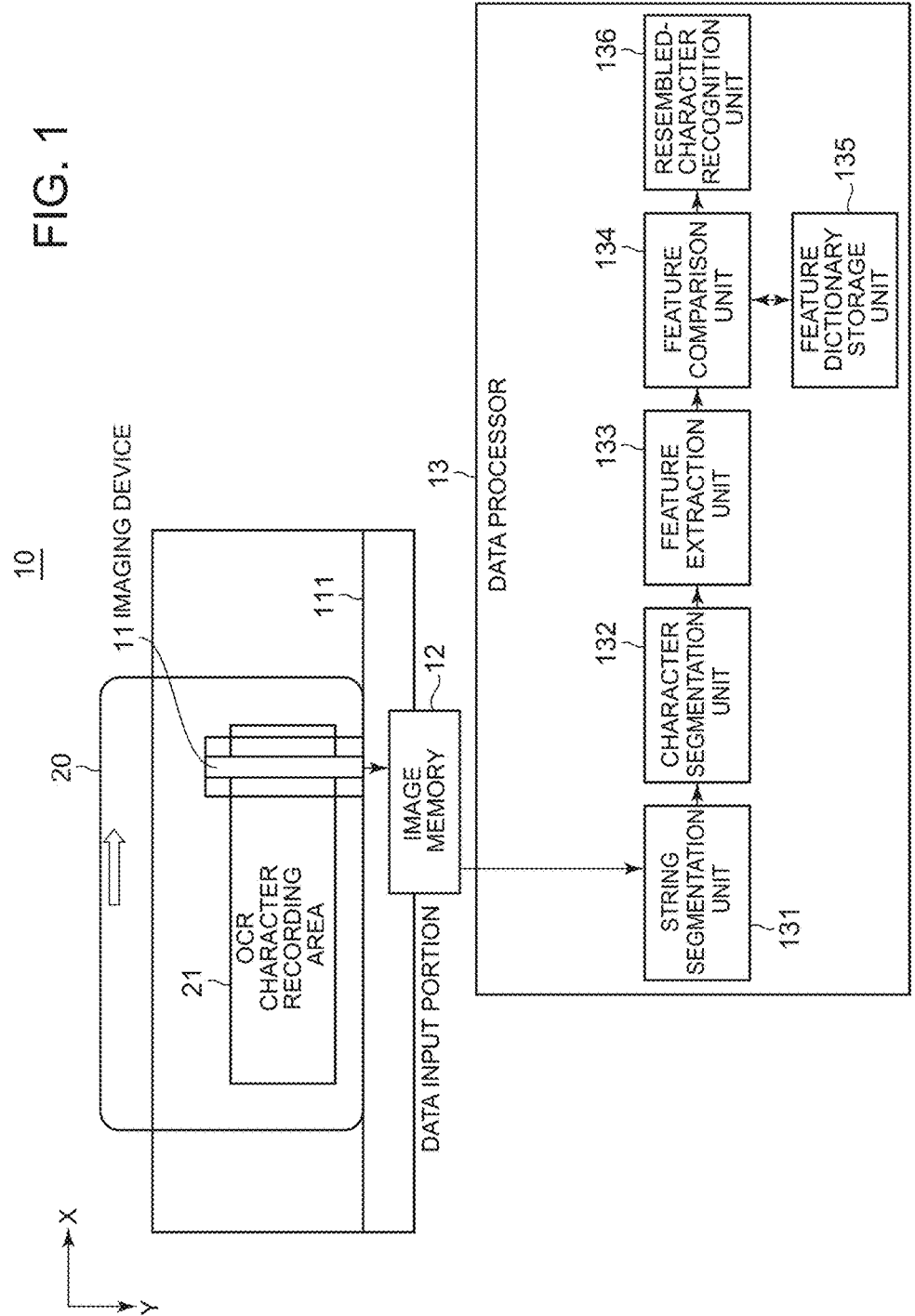
FIG. 1 is a diagram showing a configuration example of a character recognition device of an embodiment of the present invention.

FIG. 1 is a diagram showing a configuration example of a character recognition device of an embodiment of the present invention.

A character recognition device 10 of this embodiment has a function that processes digital image data obtained by capturing a character string on a recording medium such as a piece of paper or a plastic to segment and recognize individual character in the character string segmented from the image data.

To detect the segmenting positions between characters in the character string in the captured image based on the image recognition technique, the character recognition device 10 implements the following characteristic processing. The character recognition device 10 sets a provisional segmenting area surrounding two or more characters which are the recognition object (segmentation object) as a rectangular area, for example, and creates (forms) a first projection of the pixel values of the pixels arranged in the character arrangement direction and a second projection of the pixel values of the pixels in the direction orthogonal to the character arrangement direction within the rectangular area (the setting area).

For example, the character recognition device 10 creates the first projection of the pixel values of the pixels arranged in the character arrangement direction (in the X-axis direction) and the second projection of the pixel values of the pixels arranged in the direction orthogonal to the character arrangement direction (in the Y-axis direction), within the rectangular area (the setting area).

The character recognition device 10 regards each of the projections, the first projection PX and the second projection PY, as the image and applies a discriminant analysis method on the both projections to acquire binary thresholds. The character recognition device 10 acquires a first threshold TX by implementing the discriminant analysis method on the X-axis first projection PX and a second threshold TY by implementing the discriminant analysis method on the Y-axis second projection PY as the characters are arranged along the X-axis direction, calculates a synthetic threshold T of the first threshold TX and the second threshold TY, and acquires the synthetic threshold T as a binary threshold in the rectangular area (the setting area). Then, the character recognition device 10 acquires the character segmenting positions based on the acquired binary threshold. The discrimination processing based on the discriminant analysis method is described later.

A more concrete configuration of the character recognition device 10 of this embodiment and the function of the character recognition process of a captured image are described hereinafter.

The character recognition device 10, as shown in FIG. 1, has a contact-type (a one-dimensional) image sensor (a image reading unit) 11 as a data input unit, an image memory 12, and a data processor 13. The data processor 13 has a string segmentation unit 131 as a character string segmenting unit, a character segmentation unit 132 including a character segmenting position-detecting unit, a feature extraction unit 133, a feature comparison unit 134, a feature dictionary storage unit 135, and a resembled-character recognition unit 136. Note that each of these units functions as part of the character recognition device that recognizes a character string such as an OCR character string on a medium 20. Note that the transfer direction of the recording medium 20 is defined as the X-axis direction in FIG. 1. The Y-axis direction is the direction orthogonal to the X-axis direction. In this embodiment, the X-axis direction is the direction of the OCR character string formed on an OCR character recording area 21, that is the direction along which the characters are arranged as shown in FIG. 1, for a simplified description. In other words, the direction along which the characters are arranged is the X-axis direction. The direction orthogonal to the X-axis direction is the Y-axis direction. More specifically, the Y-axis direction is the direction orthogonal to the character arrangement direction.

The image sensor 11 as the image reading unit captures an OCR character string printed in the OCR character recording area 21 on the recording medium 20 and performs a photoelectric conversion on the OCR character string.

The image memory 12 saves (stores) the digitized image data of the OCR character string or the like which is captured by the image sensor 11. The original image stored in the image memory 12 is formed of a multiple number of pixels arranged in a matrix; more specifically, though not illustrated, the pixels are arranged in M rows in the X-axis direction and in N lines in the Y-axis direction. Each pixel has a pixel value (luminance value). In this embodiment, each pixel value is any value between 0 and 255, expressed by 8-bit numbers, for example; the smaller the pixel value is, the darker it gets; the larger the pixel value is, the whiter it gets. Note that the image memory 12 can take any form such as a RAM, a SDRAM, a DDRSDRAM, or a RDRAM as long as the image data can be saved.

In the data input unit, as the recording medium 20 is moved along a transfer guide of a medium transfer mechanism 111, the OCR character string printed in the OCR character recording area 21 of the recording medium 20 such as a card is captured with its character pattern by the one-dimensional image sensor 11 and photoelectrically converted, and then its image data is taken into the image memory 12. After that, the data processor 13 reads the image data out of the image memory 12, implements various processing in the above-mentioned units, and finally segments and recognizes individual characters from the OCR character string on the recording medium 20.

The size of the device is reduced by adopting a contact-type one-dimensional imaging device for the image sensor 11; however, the image sensor 11 may adopt a two-dimensional area sensor which takes as its reading object the character string on the recording medium 20 which is a reading object. The image sensor 11 is configured by a CCD or a CMOS sensor, for example.

The recording medium 20 may be a normal card of a JIS standard, a plastic card having dimensions of an 86 mm width, a 54 mm height and a 0.76 mm thickness, or an ID card, a passport book or a driver's license.

[Configuration and Function of Each Unit of Data Processor 13]

Next, the basic configuration and function of each unit of the data processor 13 are described. The data processor 13 reads the multi-valued image data (the multi-level grayscale image, the 256 gradations, for example) from the image memory 12.

The string segmentation unit 131 which is a character string segmentation unit implements a binarization processing on the multi-gradation, multi-valued image data retrieved from the image memory 12. A threshold value is calculated by a proper method, and the original, multi-gradation image is converted to a black and white binary image. Then, the string segmentation unit 131 identifies the center position of the top and bottom edges as the center line of the character string and segments the character string. More specifically, the binarized image data here is of the character string formed in the OCR character recording area 21. The string segmentation unit 131 projects this character string on to the direction along which the characters are arranged (in the X-axis direction) and detects the top and bottom edges of the character string.

The character segmentation unit 132 detects the segmenting positions between the characters in the character arrangement direction (in the X-axis direction) in the character string, segmented by the string segmentation unit 131, to implement the character segmentation processing. More specifically described, the character segmentation unit 132 sets a provisional segmenting area surrounding two or more characters which are the recognition object (the object to segmentation), a rectangular area (m rows n columns, m<M, n<N), for example, and creates the first projection PX regarding the pixel values taken along the character arrangement direction in the rectangular area (the setting area) (the X-axis direction). Further, it creates the second projection PY regarding the pixel values taken along the direction orthogonal to the character arrangement direction (Y-axis direction).

In this embodiment, the projection PX onto the X-axis is shown in a characteristic curve (graph) created by acquiring the minimum pixel values of the pixels arranged in one column. The pixels arranged in one column mentioned here means the pixels arranged in a predetermined column in the image of the character string, which is arranged in the Y-axis direction. In other words, the minimum luminance value from the multi-level luminance values (having the values that can be expressed by 8-bit numbers, for example) which is the pixel information of each pixel is acquired and regarded as the minimum pixel value on the one column. In the set rectangular area (m rows n columns, m<M, n<N), the first projection PX of the minimum pixel values are created for every column of n columns in the character arrangement direction (X-axis direction).

In the same manner as above, the character segmentation unit 132 acquires the second projection PY onto the Y-axis within the rectangular area. The second, Y-axis projection PY created by acquiring the minimum pixel values of the pixels arranged in one row. The pixels arranged in one row mentioned here means the pixels arranged in a predetermined row in the image of the character string, which is arranged in the X-axis direction. In other words, the minimum luminance value from the multi-level luminance values (having the values that can be expressed by 8-bit numbers, for example) which is the pixel information of each pixel is calculated and regarded as the minimum pixel value in the one row. In the set rectangular area (m rows n columns, m<M, n<N), the second projection PY of the minimum pixel values are created for every row of n rows in the direction orthogonal to the character arrangement direction (Y-axis direction).

The character segmentation unit 132 regards each of the first projection PX and the second projection PY as the image and acquires binary threshold values by applying a discriminant analysis method on the projections. The character segmentation unit 132 acquires a first threshold TX by implementing a discriminant analysis method on the first projection PX and a second threshold TY by implementing the discriminant analysis method on the second projection PY and acquires a synthetic threshold T of the first threshold TX and the second threshold TY and takes it as a character segmentation binary threshold for the rectangular area (the setting area).

In this embodiment, the character segmentation unit 132 calculates the average of the first threshold value TX and the second threshold value TY for the synthetic threshold T; the acquired synthetic threshold value is taken as a [character segmentation] binary threshold.

Then, the character segmentation unit 132 calculates character segmenting positions based on the acquired binary threshold.

Note that the character segmentation processing by the character segmentation unit 132 is described in detail later.

When the character segmentation processing is finished at the character segmentation unit 132, the data processor 13 acquires the circumscribed rectangle area (the coordinate values at top, bottom, left and right) of the character which is the recognition object.

A feature extraction unit 133 divides the circumscribed rectangle area into arbitrary sub regions, that is, divides one circumscribed rectangle area into 5×5 regions, for example, each of which is regarded as a sub region; the ratio of the number of black pixels to the total number of pixels is calculated for every sub region, and a feature vector having those elements is created.

A feature comparison unit 134 compares the feature vector acquired at the feature extraction unit 133 with a standard feature vector which has been acquired in advance about all the characters used on this medium and [the vector] having the highest level of resemblance (the normalized correlation, for example) is set as a candidate character to which the character corresponds.

Note that the standard feature vector is stored in advance in a feature dictionary storage unit 135; for the feature comparison, the data of the characters having the high level of resemblance is extracted from the feature dictionary storage unit 135 and the feature comparison is implemented by the feature comparison unit 134.

A resembled-character recognition unit 136 basically recognizes the candidate character determined through the feature comparison at the feature comparison unit 134 as the character used in the medium.

[Acquiring Character Segmentation Binary Threshold by Character Segmenting Position-Detecting Unit]

Described next are how a character segmentation binary threshold is acquired and how a character-segmenting positions are detected (the character segmentation processing) at the character segmenting position-detecting section of the character segmentation unit 132, which has a characteristic function of the character recognition device 10 of this embodiment.

[Block Configuration of Character Segmentation Unit 132]

Figure 2:
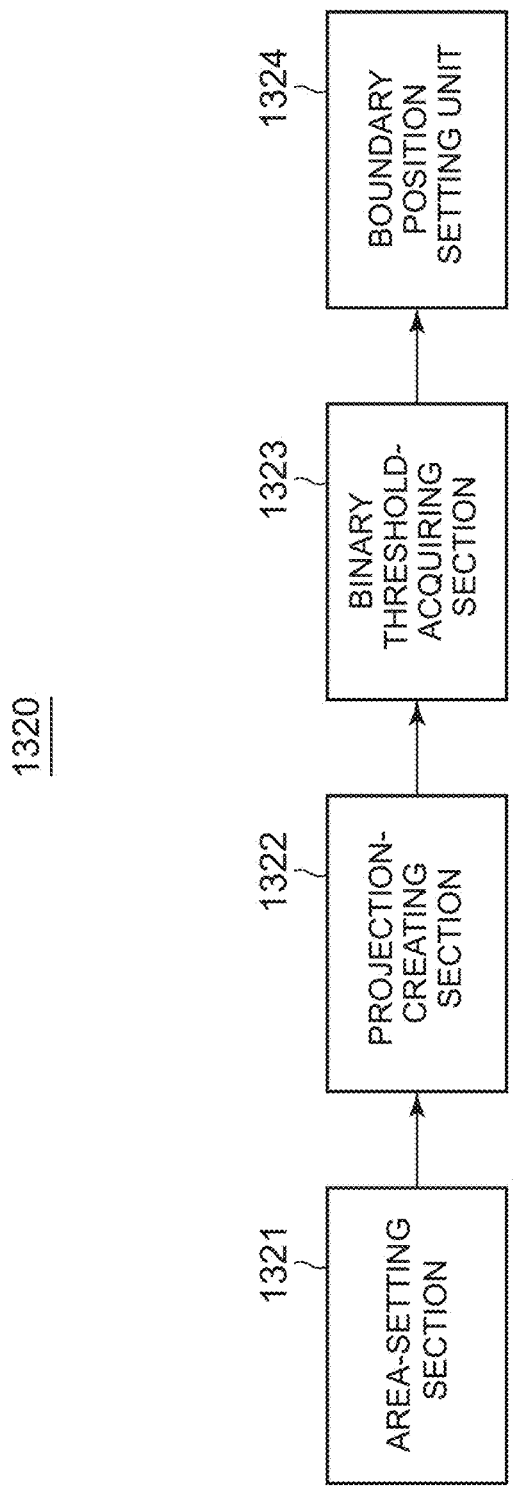
FIG. 2 is a block diagram showing a configuration example of a character segmenting position-detecting unit in a character segmentation unit of this embodiment.

FIG. 2 is a block diagram showing a configuration example of the character segmenting position-detecting unit of the character segmentation unit of this embodiment.

The character segmenting position-detecting unit 1320 of the character segmentation unit 132 of this embodiment consists of an area-setting section 1321, a projection-creating section 1322, a binary threshold-acquiring section 1323, and a position-detecting section 1324, as shown in FIG. 2.

The area-setting section 1321 sets a rectangular provisional segmenting area (a rectangle area) surrounding two or more of neighboring or continuously neighboring multiple characters that are the character recognition object, with respect to the character string segmented by the string segmentation unit 131.

The projection-creating section 1322 creates a projection within the rectangle area RCTA set at the area-setting section 1321. More specifically, within the rectangle area RCTA set at the area-setting section 1321, the projection creating section 1322 creates a first, X-axis projection PX of the pixel values of the pixels arranged in the X-axis direction in which characters are arranged and a second, Y-axis projection PY of the pixel values of the pixels arranged in the Y-axis direction. Note that the pixel value (the luminance value) of each pixel is processed in the multi-valued image data of the gray-scale image saved in the image memory 12.

More specifically described, the projection-creating section 1322 creates the first, X-axis projection PX of the minimum pixel values of the pixels arranged in the X-axis direction and the second, Y-axis projection PY of the minimum pixel values of the pixels arranged in the Y-axis direction, within the rectangle area RCTA set by the area-setting section 1321.

The binary threshold-acquiring section 1323 acquires a synthetic threshold T of the first threshold TX, which is acquired by applying the discriminant analysis method on the first, X-axis projection PX and the second threshold Y, which is acquired by applying the discriminant analysis method on the second, Y-axis projection PY, as a character segmentation binary threshold for the rectangle area (the setting area) RCTA.

The binary threshold-acquiring section 1323 acquires the synthetic threshold T by calculating the average of the first threshold TX and the second threshold TY by {(TX+TY)/2}, and the calculated synthetic threshold T is taken as a character segmentation binary threshold.

The position-detecting section 1324 acquires the character-segmenting positions based on the [character segmentation] binary threshold calculated at the binary threshold value-acquiring section 1323. The position-detecting section 1324 compares the binary threshold with the level value of the projection profile, and acquires the character-segmenting positions while considering the period in the projection profile that exceeds the binary threshold as a space between the characters. The position-detecting section 1324 judges the period in the projection profile that exceeds the binary threshold value as a space between the characters and takes the mid-point of the space as the boundary position, for example.

Note that, in this embodiment, the projection-creating section 1322 is configured to create a projection within the rectangle area RCTA set by the area-setting section 1321.

Hereinafter, while the processing by the character segmentation unit of this embodiment is described, the reason for adopting the configuration of the character segmentation unit of this embodiment is also described. Then, a more concrete processing example of the character segmentation unit of this embodiment is described.

Figure 3:
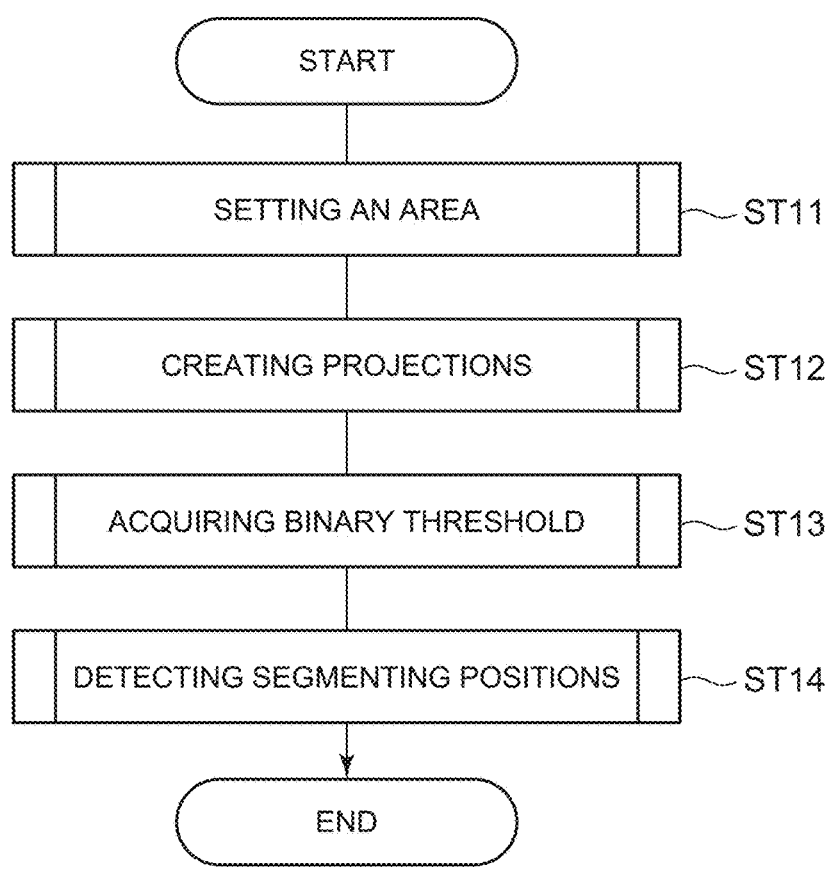
FIG. 3 is a flowchart showing a process flow of the character segmentation positon-detecting section in the character segmentation unit of this embodiment.

FIG. 3 is a flowchart showing the processing flow of the character segmenting position-detecting unit at the character segmentation unit of this embodiment.

As described above, the character segmentation unit 132 detects (searches) character-segmenting positions in the horizontal direction in every character string line. In this embodiment, the configuration as shown in FIG. 2 is adopted.

[Detection of Character-Segmenting Positions in this Embodiment]

In the character segmenting position-detecting unit 1320 shown in FIG. 2, a rectangular provisional segmenting area (a rectangle area) RCTA which surrounds two or more neighboring characters which are the object of recognition processing is first set by the area-setting section 1321 in Step ST11, as shown in FIG. 3. Next, in Step ST12, the projection-creating section 1322 creates, within the rectangle area RCTA set by the area setting section 1321, the first projection PX of the minimum pixel values of the pixels arranged in the X-axis direction and the second projection PY of the minimum pixel values of the pixels arranged in the Y-axis direction. The minimum pixel value has been selected in the multi gradation, gray-scale image data stored in each pixel.

Then, in Step ST13, the binary threshold-acquiring section 1323 acquires the synthetic threshold T of the first threshold value TX, which is calculated by applying the discriminant analysis method on the first, X-axis projection PX and the second threshold Y, which is calculated by applying the discriminant analysis method on the second, Y-axis second projection PY, as a character segmentation binary threshold for the rectangle area (the setting area) RCTA. The binary threshold value-acquiring section 1323 acquires the synthetic threshold value T by calculating the average of the first threshold TX and the second threshold TY by {(TX+TY)/2}, and the calculated synthetic threshold value T is taken as a character segmentation binary threshold.

In Step ST14, the position-detecting section 1324 acquires a character-segmenting position based on the binary threshold calculated at the binary threshold-acquiring section 1323. The position-detecting section 1324 compares the binary threshold with the level value of the projection profile and takes the period in the projection file that exceeds the binary threshold as a space between the characters and acquires the character segmenting position. The position-detecting section 1324 judges the period in the projection profile that exceeds the binary threshold as a space between the characters, and acquires the mid-point of the space as the boundary position.

[Specific Example of Character Segmentation Processing of this Embodiment]

Next, an example of the character segmentation processing at the character segmenting position-detecting unit 1320 in the character segmentation unit 132 which has the above features is described in detail associated with FIG. 4 through FIG. 10.

Figure 4:
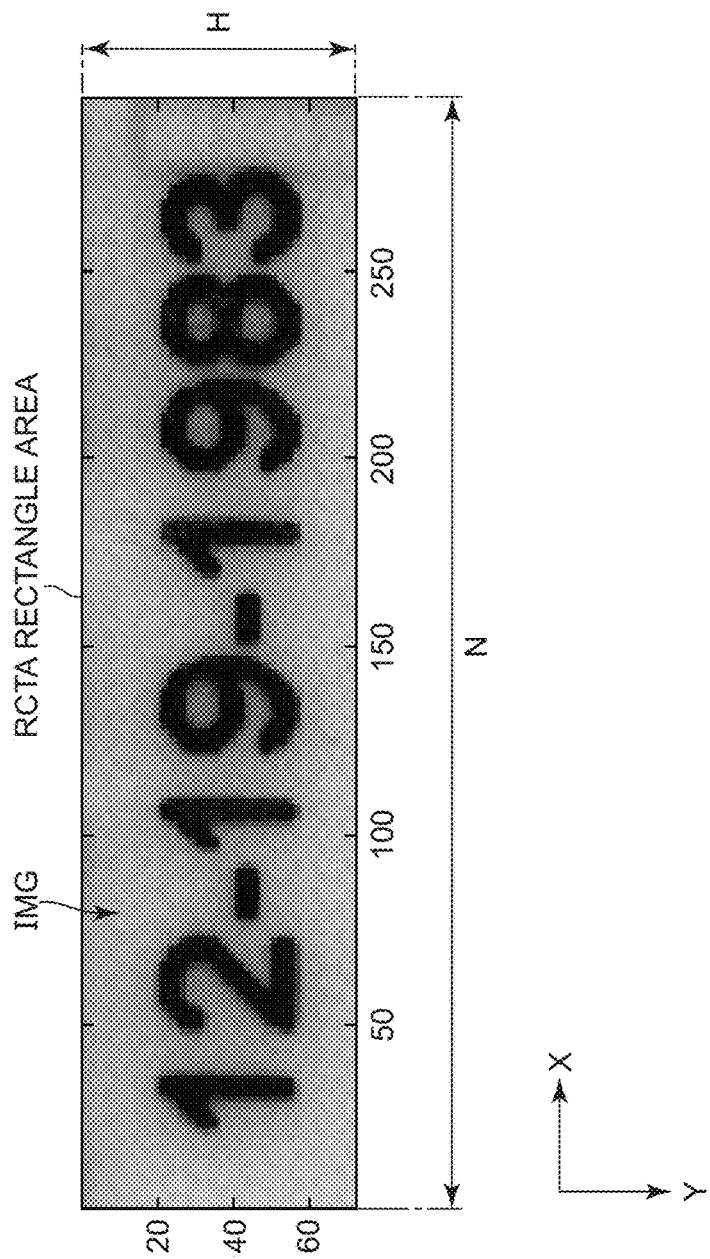
FIG. 4 is a diagram showing an example of the image of a character recognition object of this embodiment and an example of a rectangular area set in a part of the image by an area-setting section.

FIG. 4 is a diagram showing an example of the image which is a character recognition object of this embodiment and an example of a rectangle area which is set in part of the image by the area setting section.

Figure 5A:
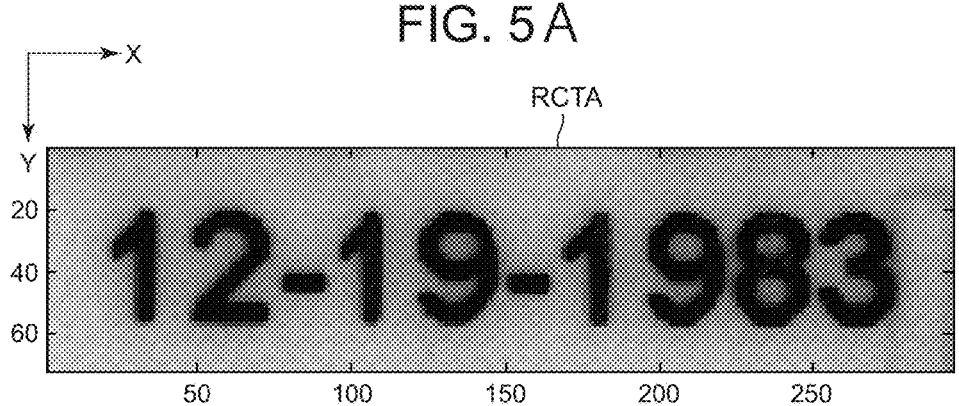
FIGS. 5A, 5B, and 5C are diagrams showing projection profiles created corresponding to the rectangular area, by a projection creating section, in which the minimum pixel values in a line in the Y-axis direction and in a line in the X-axis direction are adopted as the pixel values of the pixels.
Figure 5B:
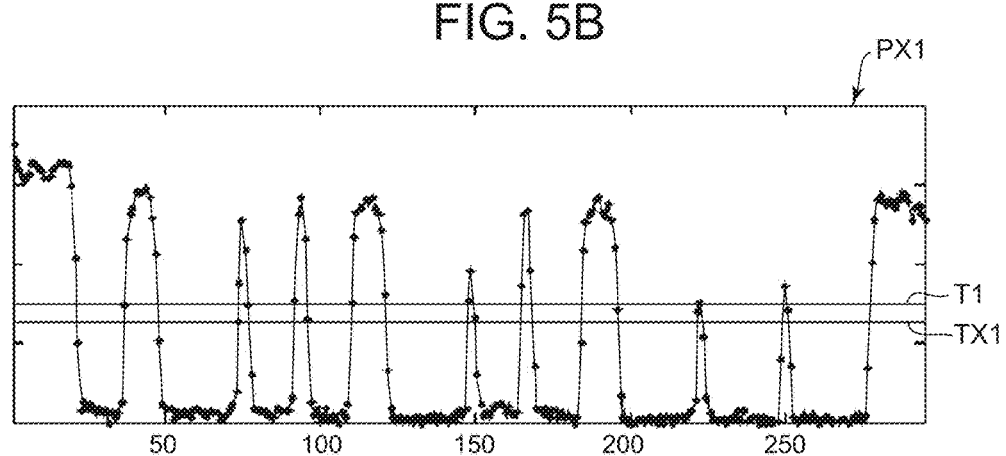
Figure 5C:
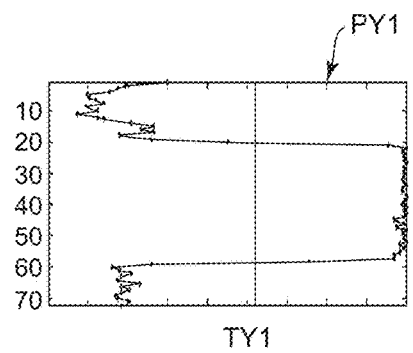
Figure 6A:
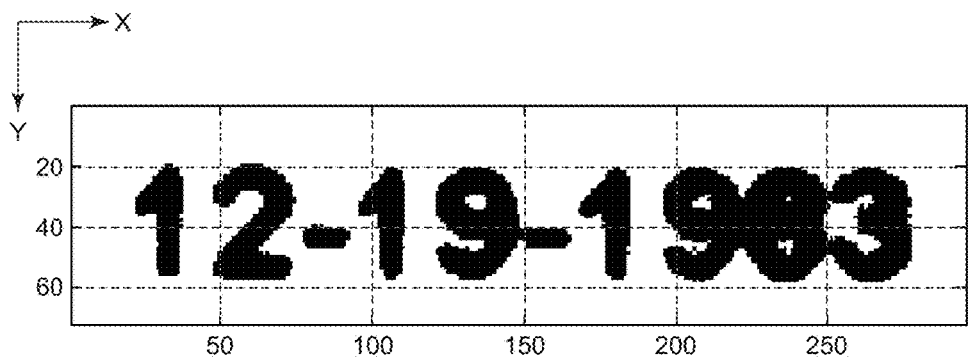
FIG. 6A is a binary image acquired by without having at least an embodiment of the present invention applied.
Figure 6B:
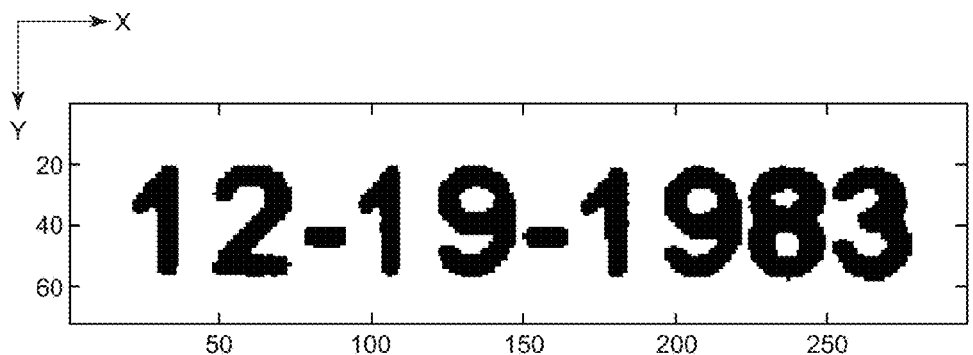
FIG. 6B is a binary image acquired by using a binary threshold acquired based on the projection profiles of FIGS. 5A-5C.

FIG. 5 shows diagrams of projection profiles created corresponding to the rectangle area by a projection-creating section, in which the minimum pixel values in one column in the Y-axis direction and in one row in the X-axis direction are taken as the pixel values for the pixels. FIG. 5(A) [lit: 6(A)] shows a rectangle area RCTA and a character string; FIG. 5(B) shows a profile of a first, X-axis projection PX; FIG. 5(C) shows a profile of a second, Y-axis projection PY. FIG. 6 shows a binary image to which at least an embodiment of the present invention is not applied and another binary image which is obtained by using a binary threshold calculated based on the projection profiles shown in FIG. 5. FIG. 6(A) is a binary image to which at least an embodiment of the present invention is not applied; FIG. 6(B) is a binary image which is obtained by using the binary threshold calculated based on the projection profiles shown in FIG. 5.

Figure 7:
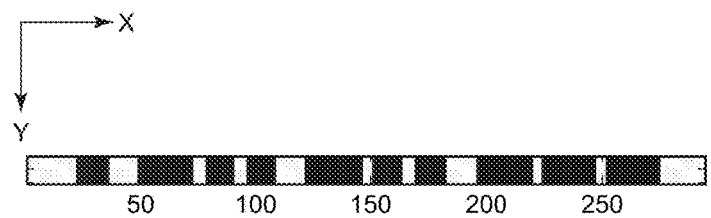
FIG. 7 is a diagram to explain how to acquire a binary threshold by implementing a discriminant analysis method while taking the X-axis first projection PX, which is a one-dimensional number, as the 1×N image.
Figure 8:
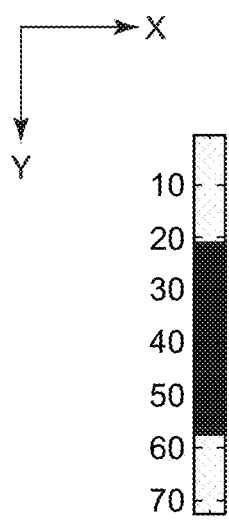
FIG. 8 is a diagram to explain how to acquire a binary threshold by implementing a discriminant analysis method while taking the Y-axis second projection PY, which is a one-dimensional number, as the 1×N image.

FIG. 7 is a diagram to explain how to acquire a binary threshold by applying a discriminant analysis method while regarding the first, X-axis projection PX, which is a one-dimensional number, as the 1×N image. FIG. 8 is a diagram to explain how to acquire a binary threshold by applying the discriminant analysis method while regarding the second, Y-axis projection PY, which is a one-dimensional number, as the 1×N image.

Note that, as described above, the minimum pixel values within the vertical and horizontal lines can be used as the pixel values regarding the pixels, as in the example of FIG. 5. In this case, the character segmentation unit 132 is instructed in advance that the minimum pixel values in the Y-axis direction and the X-axis direction are used as the pixel values regarding the pixels. The character segmentation unit 132 is configured such that a processor, which acquires the projection, also implements processing by adopting the minimum values of the pixel values as instructed.

Suppose that the image IMG on which character recognition is about to be implemented is as in FIG. 5. The example of FIG. 4 shows the image of a character string that contains characters "1", "2", "-", "1", "9", "-", "1", "9:", "8" and "3". This character sting corresponds to the image data obtained by capturing characters printed in the OCR character recording area 21 on the recording medium 20. Note that the number sequence is an example in which only numbers are selectively read from Date of Birth (Dec. 19, 1983), for example. Another example for such a number sequence can be the Expiration Date of a recording medium, etc.

In this example, along the character arrangement direction (X-axis direction), the characters "1" and "2", the characters "2" and "-", the characters "-" and "1", the characters "1" and "9", the characters "9" and "-", the characters "-" and "1", the characters "1" and "9", the characters "9" and "8" and the characters "8" and "3" are respectively neighboring characters.

In the example of FIG. 4, there is a wider space between the characters "1" and "2", "2" and "-", "1" and "9", "9" and "-", "-" and "1" and "1" and "9", in which the boundaries between two characters are clearly shown. On the other hand, the space is narrower between the characters "9" and "8" and the characters "8" and "3", in which the boundaries between two characters are not very clear and the space between the characters is a darkened area.

At the character segmenting position-detecting unit 1320 of the character segmentation unit 132 of the character recognition device 10, the area-setting section 1321 first sets an area in the character string which has been segmented (Step ST11 in FIG. 4). In other words, the area-setting section 1321 sets a rectangle area RCTA to include the entire sting of multiple characters which are the recognition object. In this case, as shown in FIG. 5, the rectangle area RCTA is set to surround the number string (the character string) "12-19-1983".

When the (coordinate) positions along which the character string is formed are known, the area-setting section 1321 determines the height H of the rectangle are RCTA (in the Y-axis direction) based on its information. When the (coordinate) positions along which the character string is formed are not known, the position of the character string in the Y-axis direction is determined by a proper method, and then the positions of the top side and the bottom side of the rectangle area RCTA is determined based on the information.

When the (coordinate) positions along which the character string is formed are unchanging, the width N of the rectangle area RCTA is determined based on the standard information of the positions. When the (coordinate) position of the direction in which the characters are arranged is changeable, the (coordinate) position of the character string in the X-axis direction is determined by a proper method, and then the position of the left edge and the right edge of the rectangle area may be determined according to that information. It is preferred that an appropriate blank space from the edge position of the actual character be provided to allow for errors in the character position.

Next, the projection-creating section 1332 creates projections (Step ST12 in FIG. 3). The projections are created by projecting the image of the characters onto the X coordinate and to the Y coordinate. FIG. 5 shows the characteristic curves (the profiles) of the projection PX1 and the projection PY1, which are acquired by projecting the number string (the character string) of FIG. 4, "12-19-1983", and acquiring the first and second projections of the minimum pixel values. In other words, in Step ST12, the projection-creating section 1322 creates, within the rectangle area set by the area-setting section 1321, the first, X-axis projection PX of the minimum pixel values regarding the pixels arranged in the X-axis direction and the second, Y-axis projection PY of the minimum pixel values regarding the pixels arranged in the Y-axis direction.

Then, the binary threshold-acquiring section 1323 acquires a binary threshold (Step ST13 in FIG. 3). The binary threshold-acquiring section 1323 regards each of the first projection PX and the second projection PY as the image and applies a discriminant analysis method to calculate a first binary threshold TX, which is the first threshold value, and a second binary threshold TY, which is the second threshold value. The method (the processing at the binary threshold-acquiring section) is described in detail.

Now, the first projection PX is expressed by p (i) where i=1:N. N indicates the width of the rectangle area RCTA, and "i=1: N" means that "i" changes from 1 up to N. Having a variable t (1<t<N) introduced, the projection p(i), when i=t, is divided into two elements (regions) of "p1=(1:t)" and "p2=p(t+1:N)" which are the class CLS1 and the class CLS2. The mean value m1 in the class CLS1 and the mean value m2 in the class CLS2 can be acquired by the following formula.

$$m1 = \frac{\sum_{i=1}^{t} p(i)*i}{\sum_{i=1}^{t} p(i)}, m2 = \frac{\sum_{i=t+1}^{N} p(i)*i}{\sum_{i=t+1}^{N} p(i)} \quad \text{[Formula 1]}$$

Also, the overall mean value mt can be acquired by the following formula.

$$mt = \frac{m1*\sum_{i=1}^{t} p(i) + m2*\sum_{i=t+1}^{N} p(i)}{\sum_{i=1}^{N} p(i)} \quad \text{[Formula 2]}$$

Therefore, the within-class variance Sw can be given by the following formula.

$$sw(t) = \sum_{i=1}^{t} p(i)*(i-m1)^2 + \sum_{i=1+1}^{N} p(i)*(i-m2)^2 \quad \text{[Formula 3]}$$

The between-class variance Sb can be given by the following formula.

$$sb(t) = \sum_{i=1}^{t} p(i)*(m1-mt)^2 + \sum_{i=t+1}^{N} p(i)*(m2-mt)^2 \quad \text{[Formula 4]}$$

Then, the variance ratio Rs(t) is acquired as follows.

$$Rs(t)=sb(t)/sw(t) \quad \text{[Formula 5]}$$

The projection p(i) where i=1:N is a one-dimensional number here; however, in this embodiment, as shown in FIG. 7, [the projection p(i)] is taken as the image of the size 1×N and is applied a discriminant analysis to calculate a threshold value. The value shown by a line in the X-axis direction in FIG. 5(B) is the first binary threshold TX1 which is a first threshold value acquired from the first projection PX1.

In this embodiment, as shown in FIG. 8, the projection PY is taken as the image of the size 1×N and applied a discriminant analysis to acquire a threshold value, in the same manner [as the projection PX]. The value shown by a line in the Y-axis direction in FIG. 5(C) is the second binary threshold TY1 which is a second threshold value acquired from the second projection PY1.

Then, in the example of FIG. 5 in this embodiment, the average of the first binary threshold TX1, which is the first threshold value, and the second binary threshold TY1, which is the second threshold value, is calculated by {T1=(TX1+TY1)/2} as a synthetic threshold value T1 which is taken as the final binary threshold.

Next, the position-detecting section 1324 acquires character-segmenting positions based on the final binary threshold (Step ST14 in FIG. 3). In the processing associated with the example shown in FIG. 5, each of the first projection PX1 and the second projection PY1, which are respectively created by adopting the minimum pixel values of the pixels arranged in the Y-axis direction and the X-axis direction, is taken as the image and is applied a discriminant analysis method to acquire the first binary threshold TX1, which is the first threshold value, and the second binary threshold TY1, which is the second binary threshold value; by using the synthetic threshold value T1 of those binary thresholds, the boundary positions between the characters are detected, and the binary image is acquired according to the detection result.

As mentioned before, FIG. 6 shows the binary image which is acquired without having at least an embodiment of the present invention applied and the binary image which is acquired by using the binary threshold value calculated based on the projection profiles of FIG. 6.

The binary image which is acquired without having at least an embodiment of the present invention applied shows, as shown in FIG. 6(A), that the character line drawing is thicker than necessary. Particularly, of the character string "12-19-1983", the characters "9", "8", and "3" have the line drawings which are too thick to read. Also, the thick lines are broadly darkened (with low luminance) and touching each other into the wide range of the space between the characters "9" and "8" as well as between "8" and "3", making most of the white section of the character itself appear black.

On the other hand, in the binary image acquired by using the binary threshold which is acquired based on the projection profiles of FIG. 5, the character line drawing is significantly prevented from becoming too thick, compared to the conventional example (the comparison example), as shown in FIG. 6(B). In particular, the line drawing of individual character, "1", "2", "-", "1", "9", "-", "1", "9", "8", or "3" from the character string "12-19-1983" is prevented from becoming too thick so that it can be read very easily. Also, the space between the characters "9" and "8" and the space between the characters "8" and "3" are significantly prevented from becoming darkened over a wider area of the space, and the character line is prevented from becoming too thick so that the white section of each character itself can be sufficiently recognized.

In the above manner, the binary image acquired by using the binary threshold which is acquired based on the projection profiles of FIG. 5 is a more desirable image, in which the character line drawing is prevented from becoming too thick, than the binary image acquired without having at least an embodiment of the present invention applied.

As described above, the first projection PX is created by adopting the minimum pixel vales of the pixels arranged along the vertical line and the second projection PY is created by adopting the minimum pixel values of the pixels arranged along the horizontal line. Then, a discriminant analysis processing is implemented on both the first and second projections PX and PY to respectively acquire a binary threshold TX and a binary threshold TY. A synthetic threshold is acquired based on both of the binary threshold TX and TY. Because the character recognition device 10 of at least an embodiment of the present invention acquires a character segmentation positions based on the synthetic threshold T, the character line drawing can be prevented from becoming unnecessarily thick. When the minimum pixel values are taken along the lines in the Y-axis direction and the X-axis direction, the binary threshold value is set at a relatively low position; therefore, the character stroke can significantly be prevented from becoming thicker than necessary.

[Overall Operation of Character Recognition Device]

The overall operation of the character recognition device 10 of this embodiment is next described associated with FIG. 10. FIG. 9 is a flowchart to explain the overall operation of the character recognition device 10 of this embodiment.

Step ST101:

As the recording medium 20, such as a card, is slid along a transfer guide of a medium transfer mechanism, the character pattern of an OCR character string printed in an OCR character recording area 21 is read by the medium transfer mechanism 111 and is photoelectrically converted (Step ST101).

Step ST102:

The signal acquired through photoelectric conversion is first amplified by an amplifier and then converted into a digital signal by an analog-to-digital converter (ADC) and then taken into an image memory 12 (Step ST102).

Step ST103: Character String Segmentation Unit

Next, a string segmentation is implemented at the string segmentation unit 131 (Step ST103). More specifically described, at the string segmentation unit 131, the image data is retrieved from the image memory 12, the character string is projected in the X-axis direction and the top and bottom edges of the character string are detected. At the string segmentation unit 131, the center position of the top and bottom edges is identified as the center line of the character string for segmentation.

Step ST104:

Next, a character segmentation is implemented at the character segmentation unit 132 which includes the character separating position-detecting section 1320 (Step ST104). More specifically described, at the character segmenting position-detecting unit 1320 of the character segmentation unit 132, a provisional segmenting rectangle area surrounding multiple characters which are the recognition object is set by the area-setting section 1321. Then, projections within the rectangle area are created by the projection-creating section 1322.

At the projection creating section 1322, a first, X-axis projection PX of the minimum pixel values of the pixels arranged in the X-axis direction and a second, Y-axis projection PY of the minimum pixel values of the pixels arranged in the Y-axis direction are created within the rectangle area RCTA set by the area-setting section 1321, for instance.

Next, at the binary threshold value-acquiring section 1323, the first projection PX and the second projection PY are respectively regarded as the image and a discriminant analysis method is applied to acquire a first binary threshold TX as the first threshold and a second binary threshold TY as the second threshold. At the binary threshold value-acquiring section 1323, a synthetic threshold T is calculated by calculating the average of the first binary threshold TX and the second binary threshold TY by {T=(TX+TY)/2}; this synthetic threshold value T is taken as a final binary threshold.

Next, at the position-detecting section 1324, the boundary positions of the characters are detected by using the synthetic threshold T; based on the boundary positions, the characters are segmented and a binary image for every segmented character is acquired. The processing after this is implemented using this black and white binary image.

When the processing of Step ST104 is finished, the circumscribed rectangle of the character (the coordinate values of top, bottom, left and right) which is a recognition object is acquired.

Step ST105:

Next, a feature extraction is implemented by the feature extraction unit 133 (Step ST105). More specifically described, in the feature extraction unit 133, the above-mentioned circumscribed rectangle area is divided into arbitrary sub regions (for example, one bounding rectangle area is divided into 5×5 areas, each of which is a sub region); in each sub region, the ratio of the number of the black pixels to the number of the all pixels in the sub region is acquired; and a feature vector having those ratios as the elements is created.

Step ST106:

Next, a feature comparison is implemented by the feature comparison unit 134 (Step ST106). More specifically described, at the feature comparison unit 134, the feature vector obtained in Step ST105 is compared with standard feature vectors, which are prepared in advance for all the characters used in this medium and stored in advance in the feature dictionary storage section 135, and the character having the highest level of resemblance (the normal correlation coefficient, for example) is set as a candidate character.

Step ST107:

Finally, a character recognition is implemented (Step ST107). More specifically described, the candidate character which has been identified in the feature comparison in Step ST106 is recognized as the character that is used in the medium.

As described above, according to this embodiment, the character recognition device 10 sets a provisional segmenting rectangle area RCTA surrounding multiple characters which are the recognition object and creates projections within the rectangle area RCTA. The character recognition device 10 creates the first, X-axis projection PX of the pixel values of the pixels arranged in the direction along which the characters are arranged and a second, Y-axis projection PY of the pixel values of the pixels arranged in the direction orthogonal to the character arrangement direction, within the rectangle area (the setting area) RCTA.

The character recognition device 10 regards the projection PX and the projection PY as the image respectively and applies a discriminant analysis method on them to acquire binary threshold values. The character recognition device 10 calculates a synthetic threshold T of the first threshold TX, which is calculated by applying the discriminant analysis method on the first projection taken in the character arrangement direction, and the second threshold TY, which is calculated by applying the discriminant analysis method on the second projection taken in the direction orthogonal to the character arrangement direction, and takes it as a binary threshold for the rectangle area (the setting area). Then, the character recognition device 10 acquires character segmenting positions based on the calculated binary threshold.

Major Effects of this Embodiment

Therefore, according to this embodiment, the following effects can be obtained. In this embodiment of implementing the image binarization processing, the first, X-axis projection PX (or the projection PY) of the pixel values of the pixels arranged in the character arrangement direction (X-axis direction) and the second, Y-axis projection PY (or the projection PX) of the pixel values of the pixels arranged in the direction orthogonal to the character arrangement direction (the Y-axis direction) are acquired for the rectangle area (the setting area) containing the character string which is the recognition object, and the discriminant analysis processing is implemented on both of the projections to acquire binary threshold values; using those binary threshold values, a binary threshold for the entire rectangle area is acquired; therefore, the binary threshold value can be optimized, compared to the binary threshold which is acquired without the result by the discriminant analysis method, and the character line drawing in the binary image can be kept from becoming thicker than necessary. Consequently, the character recognition performance can be improved.

In this embodiment, the projection-creating section 1322 creates, within the rectangle area (the setting area) RCTA set by the area-setting section 1321, the first projection of the minimum pixel values of the pixels arranged in the character arrangement direction and the second projection of the minimum pixel values of the pixels arranged in the direction orthogonal to the character arrangement direction. Thus, the projection-creating section 1322, taking the minimum pixel values of the pixels, acquires the first projection of the minimum pixel values of the pixels arranged in the character arrangement direction and the second projection of the minimum pixel values of the pixels arranged in the direction orthogonal to the character arrangement direction within the rectangle area (the setting area) RCTA, and using binary threshold values calculated by applying the discriminant analysis processing on both the first and second projections, a binary threshold value for the entire setting area is calculated; therefore, the binary threshold value is prevented from becoming biased toward the background side which is not an object to be recognized, and therefore, a more accurate binary threshold value can be acquired. Because of this, the character which is a recognition object and the background which is not a recognition object can precisely be separated. In other words, the binary threshold value is set to a relatively low level so that the possibility of the line drawing becoming unnecessarily thick is significantly reduced and characters can be easily recognized.

In this embodiment, the binary threshold-acquiring section 1323 acquires the synthetic threshold T by calculating the average of the first binary threshold TX and the second binary threshold TY, which is taken as the final binary threshold value. This enables the best binary threshold value to be acquired, so the character line drawing in the binary image is prevented from becoming unnecessarily thick.

In this embodiment, the position-detecting section 1324 compares the binary threshold value with the level values of the projection profiles, and takes the periods in the projection profile that exceed the binary threshold value as the spaces between characters and acquires the character segmenting positions. With this, the character segmenting positions can accurately be acquired regardless of the condition of the character boundary portions, and therefore, the binary image in which the character line drawing is prevented from becoming thicker than necessary and in which the characters are segmented well can be acquired.

Other Embodiments

In the above-described embodiment, the projection-creating section 1322 is configured to create the first projection PX of the minimum pixel values of the pixels arranged in the character arrangement direction and the second projection PY of the minimum pixel values of the pixels arranged in the direction orthogonal to the character arrangement direction within the rectangle area RCTA set by the area-setting section 1321; however, the present invention is not limited to this. For instance, the projection-creating section 1322 may be configured to create a first, X-axis projection PX adopting the sum of the pixel values of the pixels arranged in the character arrangement direction and a second, Y-axis projection PY adopting the sum of the pixel values of the pixels arranged in the direction orthogonal to the character arrangement direction within the rectangle area RCTA set by the area-setting section 1321. Alternatively, the projection creating section 1322 may be configured to create a first, X-axis projection PX adopting the average values of the pixel values of the pixels arranged in the character arrangement direction and a second, Y-axis projection PY adopting the average values of the pixel values of the pixels arranged in the direction orthogonal to the character arrangement direction within the rectangle area RCTA set by the area-setting direction 1321. As described, the pixel values used to acquire the projection may adopt the sum of the pixel values or the average values of the pixel values; any type of pixel values may be arbitrarily used and the same effects can be obtained no matter which type is chosen.

In the other embodiment that has been described here, the sum or the average value of the pixel values is used for the pixel values of the pixels, and which type of value should be used is instructed in advance to the character segmentation unit 132. The character segmentation unit 132 is configured such that the processing system for acquiring the projection also implements the processing using the sum or the average of the pixel values which it has been instructed to use.

Figure 10A:
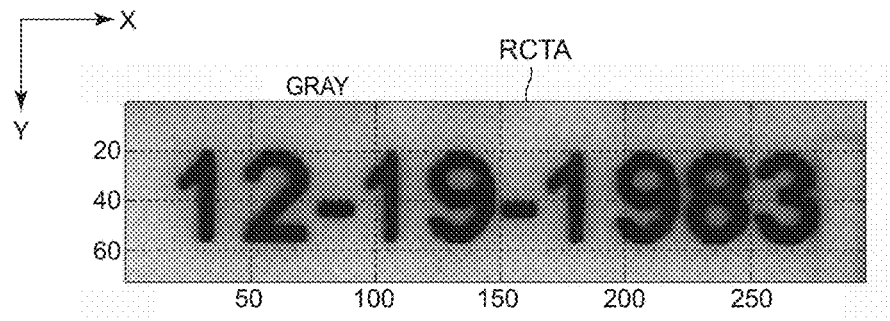
FIGS. 10A, 10B, and 10C are diagrams showing projection profiles created corresponding to the rectangle area, by the projection creating section, in which a sum or an average of the pixel values in a line in the Y direction and in a line the X direction are adopted as the pixel values of the pixels.
Figure 10B:
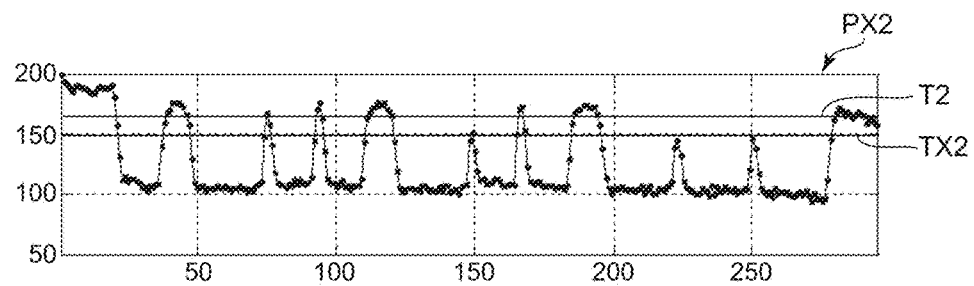
Figure 10C:
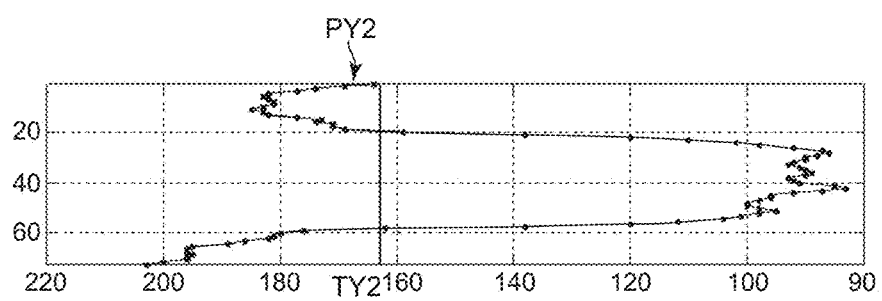
Figure 11A:
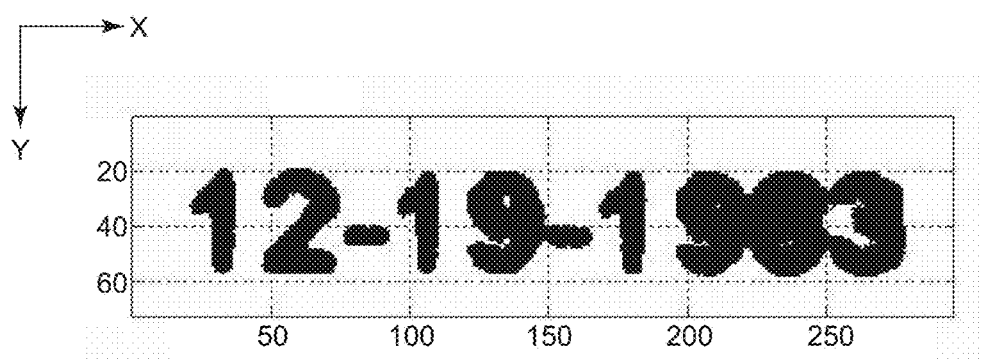
FIG. 11A is a binary image acquired by without having at least an embodiment of the present invention applied.
Figure 11B:
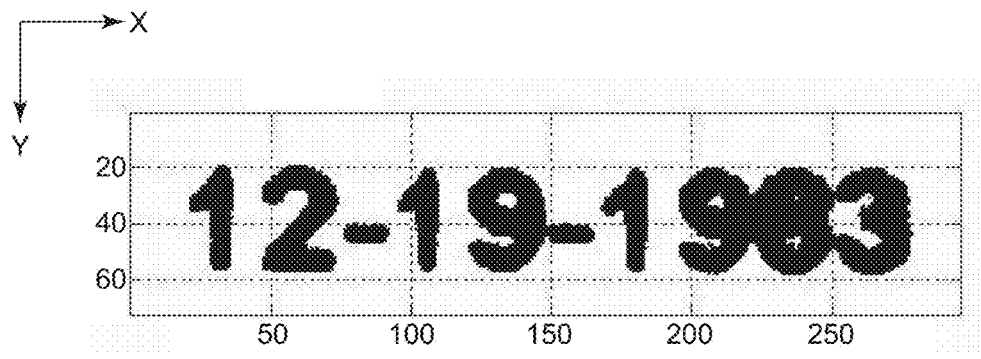
FIG. 11B is a binary image acquired by using a binary threshold acquired based on the projection profiles of FIGS. 10A-10C.

FIG. 10 shows the projection profiles created by the projection-creating section corresponding to the rectangle area in the case where the sum (or the average) of the pixel values [of the pixels arranged] in the Y-axis direction and the X-axis direction as the pixel values of the pixels. FIG. 10(A) shows the rectangle area RCTA and the character string; FIG. 10(B) shows the profile of the first, X-axis projection PX; FIG. 10(C) shows the profile of the second, Y-axis projection PY. FIG. 11 shows the binary image acquired without having at least an embodiment of the present invention applied and the binary image acquired using the binary threshold which is acquired based on the projection profiles of FIG. 10. FIG. 11(A) is the binary image without having at least an embodiment of the present invention applied; FIG. 11(B) is the binary image acquired using the binary threshold which is acquired based on the projection profiles of FIG. 10.

FIG. 10 shows the characteristic curves (the profiles) of the projections PX1 and PY1, the result of acquiring the first and second projections of the sum (or the average) of the pixel values of the character string "12-19-1983" in FIG. 4. In other words, the projection-creating section 1322 creates the first, X-axis projection of the sum (or the average) of the pixel values of the pixels arranged in the character arrangement direction and the second, Y-axis projection of the sum (or the average) of the pixel values of the pixels arranged in the direction orthogonal to the character arrangement direction within the rectangle area RCTA set by the area-setting section 1321.

Then, the values shown by the line in the X-axis direction in FIG. 10(B) is the first binary threshold TX2 which is the first threshold regarding the first projection PX2. The value shown by the line in the Y-axis direction in FIG. 10(C) is the second binary threshold TY2 which is the second threshold regarding the second projection PY2.

In the example shown in FIG. 10 in this embodiment, the average of the first binary threshold TX2 as the first threshold and the second binary threshold TY2 as the second threshold is calculated by {T2=(TX2+TY2/2) as a synthetic threshold T2, which is taken as the final threshold.

Then, the position-detecting section 1324 acquires the character segmenting positions based on the final threshold (step ST14 of FIG. 3). In the processing associated with the example shown in FIG. 10, the first projection PX2 and the second projection PY2, which are acquired adopting the sum (or the average) of the pixel values of the pixels arranged in the Y-axis direction and X-axis direction for the pixel values of the pixels, are respectively taken as the image and a discriminant analysis method is applied to the both projections to acquire the first binary threshold TX2 as the first threshold and the second binary threshold TY2 as the second threshold, [the synthetic threshold value T2 is acquired by calculating the average of the binary threshold values TX2 and TY2, the boundary positons of the characters are detected using the synthetic threshold T2, and then the binary image is acquired using the detection result.

As mentioned previously, FIG. 11 shows the binary image acquired without having at least an embodiment of the present invention applied and the binary image acquired by using the binary thresholds which are calculated based on the projection profiles of FIG. 10.

The binary image acquired without having at least an embodiment of the present invention applied has the character line drawing which has become thicker than unnecessarily, as shown in FIG. 11(A). In particular, the characters "9", "8" and "3" in the character string "12-19-1983" have the line drawing which has become too thick to read. Also, the space between "9" and "8" is almost gone over a wide range (since the character line drawing of "9" and "8" is too fat and processed as low luminance). Therefore, the white portion in each character "9" or "8" itself has become almost black; thus, the character line drawing has become thicker than necessary. The same has happened to the space between "8" and "3".

On the other hand, as shown in FIG. 11(B), the unwanted thickness of the line drawing is reduced in the binary image acquired by using the binary threshold which has been acquired based on the projection profiles of FIG. 10, compared to the conventional (comparison) example. In particular, the line drawing of the characters "9", "8" and "3" in the character string "12-19-1983" is prevented from becoming too thick to read. Also, the characters are prevented from becoming darkened over the wide area of the space between "9" and "8" and between "8" and "3", and the character line drawing is kept from becoming unnecessarily thick so that the white portion in the character itself is clearly seen, compared to the conventional (comparison) example.

Thus, the binary image acquired by using the binary threshold which is acquired based on the projection profiles of FIG. 10 is a more desirable image in which the line drawing is prevented from becoming unnecessarily thick than the binary image acquired without having at least an embodiment of the present invention applied.

As described above, in the other embodiments, the projection-creating section 1322 creates the first projection of the sum or average of the pixel values of the pixels arranged in the character arrangement direction and the second projection of the sum (or average) of the pixel values of the pixels arranged in the direction orthogonal to the character arrangement direction within the rectangle area (the setting area) set by the area-setting section 1321.

Thus, the projection-creating section 1322, using the sum or average of the pixel values as the pixel values of the pixels, acquires the first projection of the sum or average of the pixel values of the pixels arranged in the character arrangement direction and the second projection of the sum or average of the pixel values of the pixels arranged in the direction orthogonal to the character arrangement direction, a discriminant analysis processing is implemented on both of the projections to acquire binary threshold values, and a binary threshold for the entire setting area is acquired by using the binary threshold values; therefore, the final binary threshold can be better adjusted than the threshold which is not associated with the result from the discriminant analysis method, and consequently, the character line drawing can be prevented from becoming unnecessarily thick so that the white portion of the character itself is clearly shown.

The character recognition device 10 of this embodiment can be applied not only to typed characters, but also to hand-written characters as a recognition object. Also, the character recognition device 10 can be applied not only to character recognition, but also to one-dimensional or two-dimensional barcode decryption to secure the ratio of black and white for an appropriate bar width.

Also, the character recognition device 10 of this embodiment can be applied not only to cards, but also to various recording media such as a passport or a driver's license.

The same effects can be obtained even by applying this method to characters which have clear boundaries.

Note that the method described in detail above can be formed as a program which follows the above steps and can be executed by a CPU of a computer. Also, such a program can be configured to be accessed through a computer which has a recording media such as a semiconductor memory, a magnetic disc, an optical disc, or a floppy (trade mark) disk installed.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A character recognition device for use with a recording medium comprising a character string comprising characters, the character recognition device comprising:
   an image sensor configured to image the character string on the recording medium and read the character string as image data; and
   a data processor configured to segment a character string from said image data, and segment the characters from said character string to implement character recognition;
   wherein said data processor is further configured to detect positions to segment the characters;
   said data processor is further configured to:
      set an area to detect a position for segmenting said characters;
      create a first projection of pixel values of the pixels arranged in the character arrangement direction along which characters are arranged and a second projection of pixel values of the pixels arranged in an orthogonal to said character arrangement direction, at least within said setting area;
      calculate a synthetic threshold value of a first threshold, acquired by applying a discriminant analysis method on said first projection, and a second threshold, acquired by applying said discriminant analysis method on said second projection, and take it as a binary threshold for said setting area; and
      acquire character segmenting positions based on said binary threshold.

2. A character segmentation method for use with image data acquired by capturing a character string comprising characters on a recording medium, the character segmentation method comprising:
   imaging the character string on the recording medium with an image sensor;
   a character segmenting position-detecting step comprising detecting segmenting-positions of the characters in the character string imaged by the image sensor;
   wherein said character segmenting position-detecting step further comprises:
      an area-setting step comprising setting an area to detect positions for segmenting said character;
      a projection-creating step comprising creating a first projection of pixel values of the pixels arranged in the character arrangement direction along which characters are arranged and a second projection of pixel values of the pixels arranged in an orthogonal to said character arrangement direction, at least within a setting area set by said area-setting section;
      a binary threshold-acquiring step comprising calculating a synthetic threshold value of a first threshold, acquired by applying a discriminant analysis method on said first projection and a second threshold, acquired by applying said discriminant analysis method on said second projection and takes it as a binary threshold for said setting area; and
      a position-detecting step comprising acquiring character segmenting positions based on said binary threshold acquired at said binary threshold-acquiring section.

3. A non-transitory computer-readable medium for use with an image sensor and a recording medium comprising a character string comprising characters, the non-transitory computer-readable medium storing computer-executable instructions that, when executed by a computer, cause the computer to perform:
   imaging the character string on the recording medium with an image sensor;
   a character segmenting position-detecting step comprising detecting segmenting-positions of the characters in the character string imaged by the image sensor;
   wherein said character segmenting position-detecting step further comprises:
      an area-setting step comprising setting an area to detect positions for segmenting said character;
      a projection-creating step comprising creating a first projection of pixel values of the pixels arranged in the character arrangement direction along which characters are arranged and a second projection of pixel values of the pixels arranged in an orthogonal to said character arrangement direction, at least within a setting area set by said area-setting section;
      a binary threshold-acquiring step comprising calculating a synthetic threshold value of a first threshold, acquired by applying a discriminant analysis method on said first projection and a second threshold, acquired by applying said discriminant analysis method on said second projection and takes it as a binary threshold for said setting area; and a position-detecting step comprising acquiring character segmenting positions based on said binary threshold acquired at said binary threshold-acquiring section.

* * * * *